United States Patent [19]

Fujioka et al.

[11] Patent Number: 4,823,269

[45] Date of Patent: Apr. 18, 1989

[54] WHEEL SPIN CONTROL APPARATUS

[75] Inventors: Hideaki Fujioka; Koji Takata, both of Itami, Japan

[73] Assignee: Sumitomo Electric Industries, Ltd., Osaka, Japan

[21] Appl. No.: 127,437

[22] Filed: Dec. 2, 1987

[30] Foreign Application Priority Data

Dec. 2, 1986 [JP] Japan .................................. 61-287107

[51] Int. Cl.$^4$ ............................................... B60T 8/32
[52] U.S. Cl. ................................ 364/426.03; 180/197; 303/97
[58] Field of Search ................ 364/426, 565; 180/197; 361/238; 303/95, 96, 97, 99, 106, 110

[56] References Cited

U.S. PATENT DOCUMENTS

| | | | |
|---|---|---|---|
| 4,143,926 | 3/1979 | Miller | 303/110 |
| 4,164,872 | 8/1979 | Weigl | 180/197 |
| 4,260,051 | 4/1981 | Reinecke | 303/96 |
| 4,583,611 | 4/1986 | Frank et al. | 364/426 |
| 4,625,824 | 12/1986 | Leiber | 303/97 |
| 4,745,552 | 5/1988 | Phelps | 180/197 |

FOREIGN PATENT DOCUMENTS

0126051 11/1984 European Pat. Off. .
0180095 5/1986 European Pat. Off. .

Primary Examiner—Gary Chin
Attorney, Agent, or Firm—Cushman, Darby & Cushman

[57] ABSTRACT

A wheel spin control apparatus for controlling the spin occurring on at least one of driven wheels of a vehicle by the application of a braking force to the driven wheel is disclosed. The apparatus includes a spin detector for detecting the spin of the driven wheel, a spin acceleration detector for detecting an acceleration of the spin, a calculator for calculating a control variable FUNC which is proportional to the sum of the spin and the spin acceleration. When the control variable FUNC exceeds above a first threshold located in a positive region, the braking force is increasingly applied to the driven wheels, and when the control variable FUNC exceeds below a second threshold located in a negative region, the braking force is decreasingly applied to the driven wheels.

16 Claims, 6 Drawing Sheets

WHEEL SPIN CONTROL APPARATUS

BACKGROUND OF THE INVENTION

1. Field of the Invention

The present invention relates to a wheel spin control apparatus for use in an automotive vehicle for quickly and efficiently restraining the excessively large spin which occurs in driven wheels at the time of a start or during an acceleration of the vehicle. More particularly, the present invention relates to a wheel pin control apparatus which restrains the excessively large spin by the control of the brake system of the driven wheels and/or by the control of the engine.

2. Description of the Prior Art

When the rotation speed of the driven wheels of an automotive vehicle (hereinafter referred to as vehicle) is slightly faster than the speed of the vehicle, i.e., when the driven wheels spin slightly, the driving forces of the driven wheels are efficiently transmitted to a road surface, thus making it possible to drive the vehicle as desired. When the vehicle is started suddenly, accelerated suddenly or driven on a slippery road surface, the driven wheels spin in an excessively large amount, which results in the loss of the driving force of the vehicle, i.e, the engine power will not be efficiently transmitted to the road surface. Wheel spin control apparatuses have hitherto been suggested to reduce such an excessively large amount of a wheel spin to an optimum amount.

According to one prior art wheel spin control apparatus, the rotation speeds of each of driven and non-driven wheels are calculated so as to detect an excessively large amount of a spin. Upon detection of the occurrence of the spin, a braking force is applied to a driven wheel to restrain the spin. For example, according to Japanese Patent Laid-open Publication No. 16164/1986, the increase or decrease of a braking force to be applied to a driven wheel is controlled by detecting the spin amounts and accelerations of the driven wheels and, further, by comparing them with respective threshold levels.

According to prior art apparatuses for controlling the excessively great amount of a spin, the increase or decrease of a braking force to be applied to the driven wheels is determined mainly by the accelerations of the driven wheels rather than the spin amount thereof. For example, in a case where the spin amount exceeds a threshold to a great extent, if the driven wheels are accelerated slightly (for example, if it is smaller than a threshold) it is so controlled that the braking force is reduced; and if the driven wheels are accelerated in an appropriate range (for example, if it is greater than the threshold level), it is so controlled that the braking force is increased. Therefore, when an excessively large amount of a spin or an excessively small amount of a spin (excessive reduction of spin amount caused by the application of braking force to a great extent) is detected, the braking force is increased or decreased continuously, as long as the spin amount or the acceleration of the driven wheels is above the threshold levels.

As discussed above, according to the prior art apparatus, the excessive amount of spin is detected based merely on the spin amount of the driven wheels. Although the acceleration of the driven wheels may be detected, it is not used together with the detected amount of spin to detect the excessive amount of spin. In other words, according to the prior art, to control the excessive amount of spin, no consideration is given to the fact that the excessive amount of spin varies with respect to the acceleration of the driven wheel or with respect to the rate of change of the spin.

Therefore, according to the prior art apparatus, the braking force to be applied to the driven wheels is increased as long as the detected spin amount exceeds its threshold, or as long as the detected acceleration exceeds its threshold.

SUMMARY OF THE INVENTION

The present invention has been developed with a view to substantially solving the above-described problem and has for its essential object to provide a wheel spin control apparatus which restrains an excessively large amount of a spin according to the detection of the spin amount of a driven wheel and the acceleration (rate of change) of the spin amount.

A wheel spin control apparatus according to the present invention controls the spin occurring on at least one of driven wheels of a vehicle by the application of a braking force to the driven wheel. The wheel spin control apparatus according to the present invention comprises a spin detection means for detecting the spin SPIN of the driven wheel, a spin acceleration detection means for detecting an acceleration DSPIN of the spin, a calculation means for calculating a control variable FUNC given below FUNC$\alpha$SPIN+K.DSPIN   (K:constant); a first threshold producing means for producing a first threshold of the control variable FUNC in a positive region; a comparator means for comparing the control variable FUNC with the first threshold; and a brake control means for producing a braking force increasing signal within a period after the control variable FUNC exceeds above the first threshold and before the control variable FUNC reaches a positive peak point or a level which is in a predetermined relationship with the positive peak point, and during when the control variable FUNC is increasing, whereby when the braking force increasing signal is present, the braking force is increasingly applied to the driven wheel.

The wheel spin control apparatus according to the present invention further comprises a second threshold producing means for producing a second threshold of the control variable FUNC in a negative region. Thus, the comparator means compares the control variable FUNC with the second threshold, and the brake control means produces a braking force decreasing signal within a period after the control variable FUNC exceeds below the second threshold and before the control variable FUNC reaches a negative peak point or a level which is in a predetermined relationship with the negative peak point, and during when the control variable FUNC is decreasing, whereby when the braking force decreasing signal is present, the braking force is decreasingly applied to the driven wheel.

According to the present invention, the wheel spin control apparatus controls an excessively large amount of a spin according to the information of the spin amount of a driven wheel and the acceleration of the spin amount. Thus, the apparatus quickly restrains the spin amount when a spin amount abruptly or gradually increases.

BRIEF DESCRIPTION OF THE DRAWINGS

These and other objects and features of the present invention will become apparent from the following description taken in conjunction with preferred embodiments thereof with reference to the accompanying drawings, throughout which like parts are designated by like reference numerals, and in which.

DETAILED DESCRIPTION OF THE INVENTION

Figure 1:
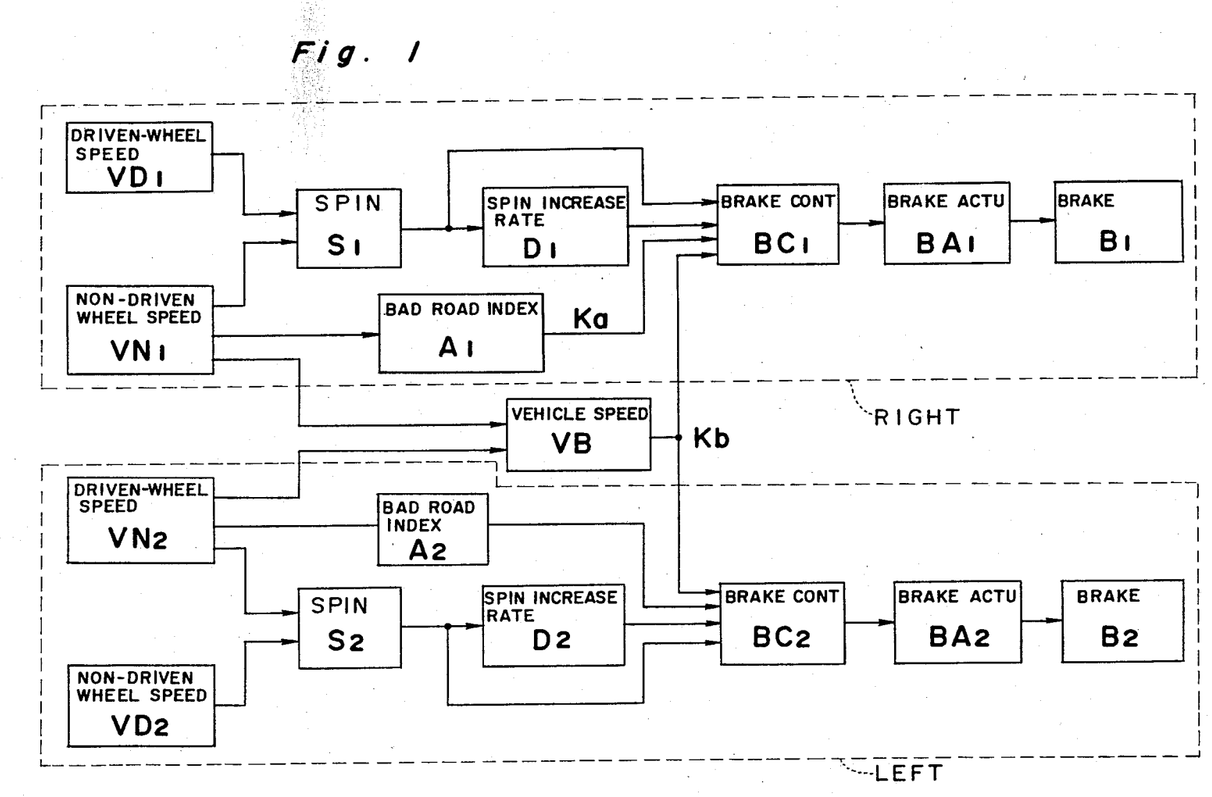
FIG. 1 is a block diagram showing a wheel spin control apparatus of a first embodiment according to the present invention.

Referring to FIG. 1, a block diagram of a first embodiment of the wheel spin control apparatus according to the present invention is shown. In FIG. 1, numeral "1" affixed to the lower right side of the reference symbol denotes a unit provided with an automotive vehicle (hereinafter referred to as vehicle) on one side (for example, the right side) thereof. Similarly, a numeral "2" affixed to the lower right side of the reference symbol denotes the unit provided with the vehicle on the other side (for example, the left side) thereof.

Reference symbol VD is a unit for detecting the speed of driven wheels; VN is a unit for detecting the speed of non-driven wheels; and S is a spin amount output unit which outputs a signal indicating the spin amount of the driven wheels. The spin amount output unit S comprises, for example, a subtracter which calculates the difference between the output of the driven wheel-speed detection unit VD and the non-driven wheel-speed detection unit VN. A spin amount is obtained by calculating the speed of each of the driven wheels and the vehicle speed, however, it is desirable to make a correction of the spin amount thus obtained to some extent when the vehicle is making a turn. The difference in the rotation speeds between the left-hand non-driven wheel and the right-hand non-driven wheel is measured for this purpose. Another method for a correction is to calculate the difference in the rotation speeds between the driven wheel and the non-driven wheel mounted on one side of the vehicle (for example, the right side) so as to obtain the most approximated value, and based on it, to calculate the difference in the rotation speeds between the left-hand non-driven wheel and the right-hand non-driven wheel. This method is disclosed, for example, in Japanese Patent Laid-open Publication No. 60937/1987, published Mar. 7, 1987 by the same assignee as the present application.

Reference symbol D denotes a spin increase rate output unit for outputting a signal indicating the rate of increase of a spin amount. The spin increase rate output unit D comprises, for example, a differentiator which takes a differential of the signal outputted from the unit S.

Reference symbol A denotes a bad road-index output unit for outputting a signal indicating a bad road-index. The level of the signal (bad road-index Ka) outputted from this unit becomes higher in proportion to the roughness of a road on which the vehicle is travelling. The detailed description of the bad road-index output unit A will be given later with reference to FIG. 2.

Reference symbol VB denotes a vehicle speed output unit which outputs a signal Kb indicating the vehicle speed. This unit is composed of, for example, an average value circuit which computes the average of the speeds between the left-hand and right-hand non-driven wheels. It is possible to eliminate the vehicle speed output VB. In this case, the vehicle speed is detected by detecting the speed of the non-driven wheel mounted on one side of the vehicle. The vehicle speed output unit VB may be replaced with a presumption arithmetic unit which outputs a vehicle speed according to the signals transmitted from the units $VN_1$ and $VN_2$ which output the speeds of the non-driven wheels. The presumption arithmetic unit is disclosed in the above mentioned Japanese Patent Laid-open Publication No. 60937/1987.

Reference symbol BC, which denotes a braking force controller, computes a control variable FUNC which is given below and is computed based on the signals transferred from the above-described spin amount output unit S, spin increase rate output unit D, bad road-index output unit A, and vehicle speed output unit VB.

$$FUNC = K_2 \cdot \left\{ VD - VN + K_1 \cdot \frac{d}{dt}(VD - VN) \right\}$$

The braking force controller BC detects whether a spin amount is excessively large or small according to the value of the control variable FUNC. If it is detected that a spin amount is excessively large or is likely to be excessively large, the braking force controlling unit BC produces a command signal indicating that a braking force should be applied or increased. If a spin amount is excessively small, the braking force controlling unit BC produces a command signal indicating that a braking force should be removed or decreased.

Reference symbol BA denotes a brake actuator which is provided for applying, removing, increasing, or decreasing a braking force in response to the command signal transferred from the braking force control unit BC. Reference symbol B denotes a brake unit.

Figure 2:
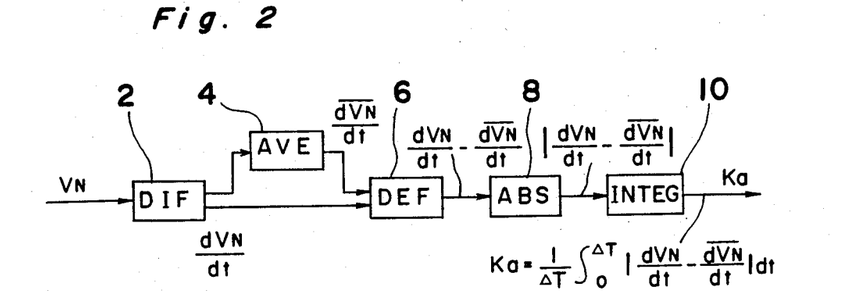
FIG. 2 is a block diagram showing a detail of a bad road-index output unit.
Figure 3:
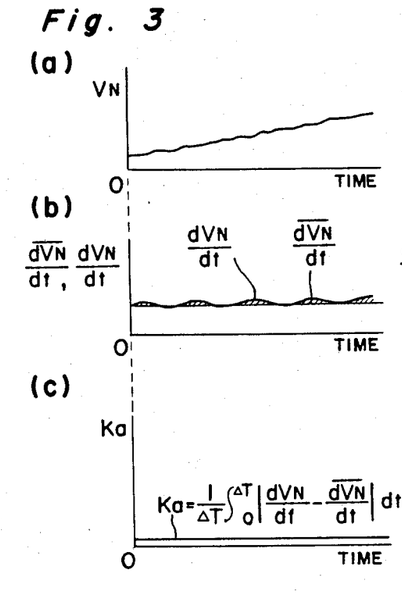
FIG. 3 shows graphs (a), (b), and (c) illustrating waveforms outputted from the bad road-index output unit of FIG. 2 when a vehicle travels on a good road.
Figure 4:
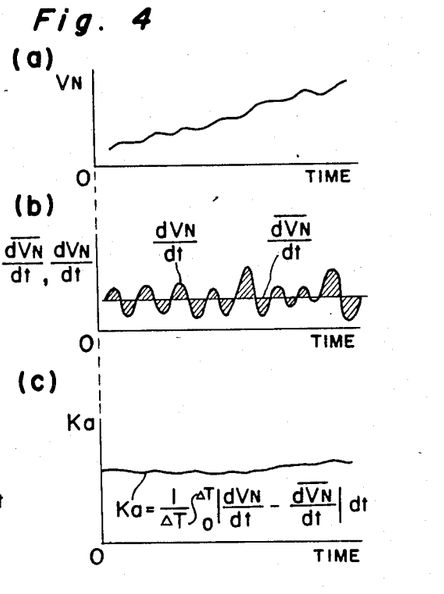
FIG. 4 shows graphs (a), (b), and (c) illustrating waveforms outputted from the bad road-index output unit of FIG. 2 when a vehicle travels on a bad road.

Next, the description is directed to the bad road-index output unit A which outputs a signal indicating a bad road-index Ka. As shown in FIG. 2, the bad road-index output unit A comprises a differentiating circuit 2, an average taking circuit 4, a deviation circuit 6, an absolute value circuit 8, and an integrating circuit 10. FIG. 3 shows the waveforms of the signals outputted from the bad road-index output unit A when the vehicle is travelling on a good road. FIG. 4 shows the waveforms of signals outputted from the same when the vehicle is travelling on a bad road.

In FIG. 3, a case is shown when the vehicle is travelling on a good road. In this case, the non-driven wheels increase their rotation smoothly when the vehicle is accelerated, and decrease their rotation smoothly when the vehicle is decelerated. Accordingly, the fluctuation width of the output, from the differentiating circuit 2, which can be expressed as dVN/dt, is small. As shown in FIG. 2, the signals outputted from the differentiating circuit 2 are transferred to the deviation circuit 6 directly, and also through the average taking circuit 4. The signal outputted from the deviation circuit 6 is transmitted from the absolute value circuit 8 to the integrating circuit 10 where the bad road-index Ka is integrated. The integrated value Ka is referred to as a bad road-index. As shown in FIG. 3, graph (c), the value Ka is small when the vehicle is travelling on a good road.

In FIG. 4, a case is shown when the vehicle is travelling on a bad road such as a gravel road or a rough road. In this case, the non-driven wheels are temporarily lifted from the road, which causes the non-driven wheels to rotate non-uniformly. Therefore, the fluctuation width of the output of the differentiating circuit 2 becomes large as shown in FIG. 4, graph (b). The bad road index Ka is computed in a manner similar to that described above. When FIG. 3, graph (c) and FIG. 4, graph (c) are compared, it is apparent that the bad road index Ka becomes high in proportion to the roughness of a road. The bad road index Ka is expressed in the following equation:

$$Ka = \frac{1}{\Delta T} \int_0^{\Delta T} \left| \frac{d}{dt} VN - \frac{\overline{d}}{dt} VN \right| dt$$

When the value of the bad road index Ka is high, the output of the non-driven wheel-speed detection unit VN fluctuates to a great extent, which in turn causes d/dt VN to fluctuate to a great extent. Consequently, the term d/dt(VD−VN) of the control variable FUNC fluctuates to a great extent as well. In order to prevent the value of the control variable FUNC from fluctuating to a great extent, a coefficient $K_1$ is calculated so as to make it an approximated value which is an inverse proportion to the bad road-index Ka.

Figure 5:
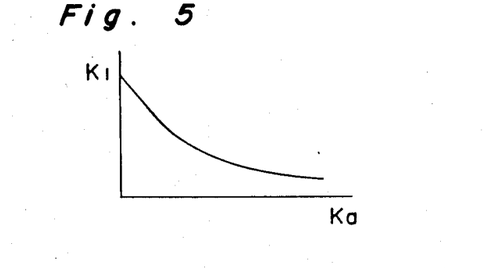
FIG. 5 is a graph showing a relationship between the bad road-index Ka and a coefficient $K_1$.

In this embodiment, the relationship between the bad road-index Ka and the coefficient $K_1$ is shown in FIG. 5.

According to the block diagram shown in FIG. 1, the bad road index output unit A is mounted on the left-hand and right-hand sides of the vehicle, however, the bad road-index output unit A may be mounted on only one side of the vehicle, from which the signal of the bad road-index Ka is transferred to the braking controllers $BC_1$ and $BC_2$. As another modification, the bad road-index output unit A may be so constructed as to receive the signal Kb from the unit VB.

The wheel spin control apparatus shown in FIG. 1 is controlled by a microcomputer. The process to be performed by the microcomputer is described hereinafter with reference to the flow chart shown in FIG. 6.

Figure 6:
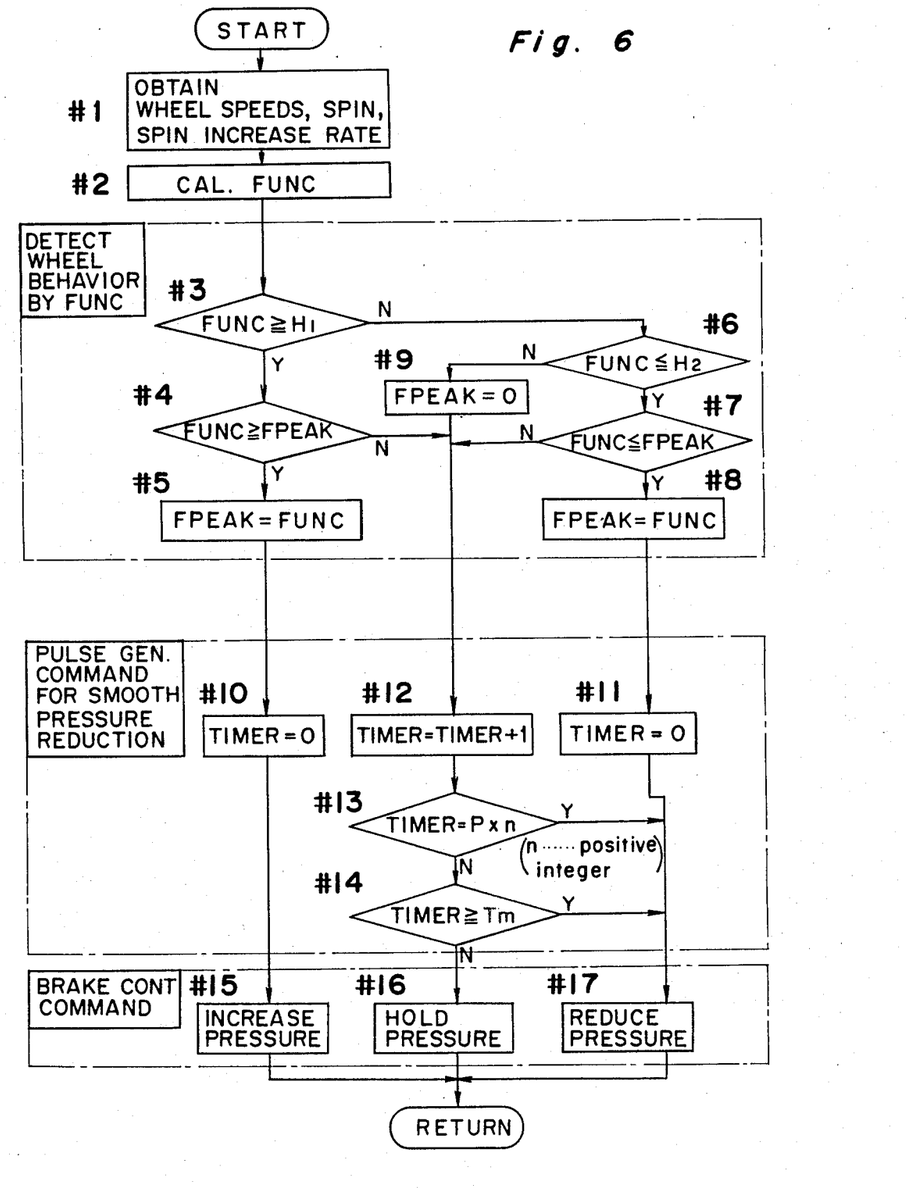
FIG. 6 is a flow chart showing the operation of the apparatus shown in FIG. 1.

At step #1, the wheel spin output unit S computes the difference in the rotation speeds between the driven wheel and the non-driven wheel, thereby outputting a spin amount signal expressed as follows:

VD−VN.

Then, the spin amount increase rate output unit D differentiates the spin amount (VD−VN), thereby outputting the spin acceleration signal d/dt(VD−VN).

At step #2, the braking controller BC receives a spin amount signal, a spin acceleration signal, a signal Ka outputted from the bad road-index output unit A, and a vehicle speed signal outputted from the vehicle speed output unit VB, thereby computing a control variable expressed by the following equation:

$$FUNC = K_2 \left\{ (VD - VN) + K_1 \frac{d}{dt} (VD - VN) \right\}$$

wherein $$K_1 = \frac{1}{Ka + Ca} \quad (Ca: \text{constant})$$

$$K_2 = \frac{1}{Kb + Cb} \quad (Cb: \text{constant})$$

Figure 7:
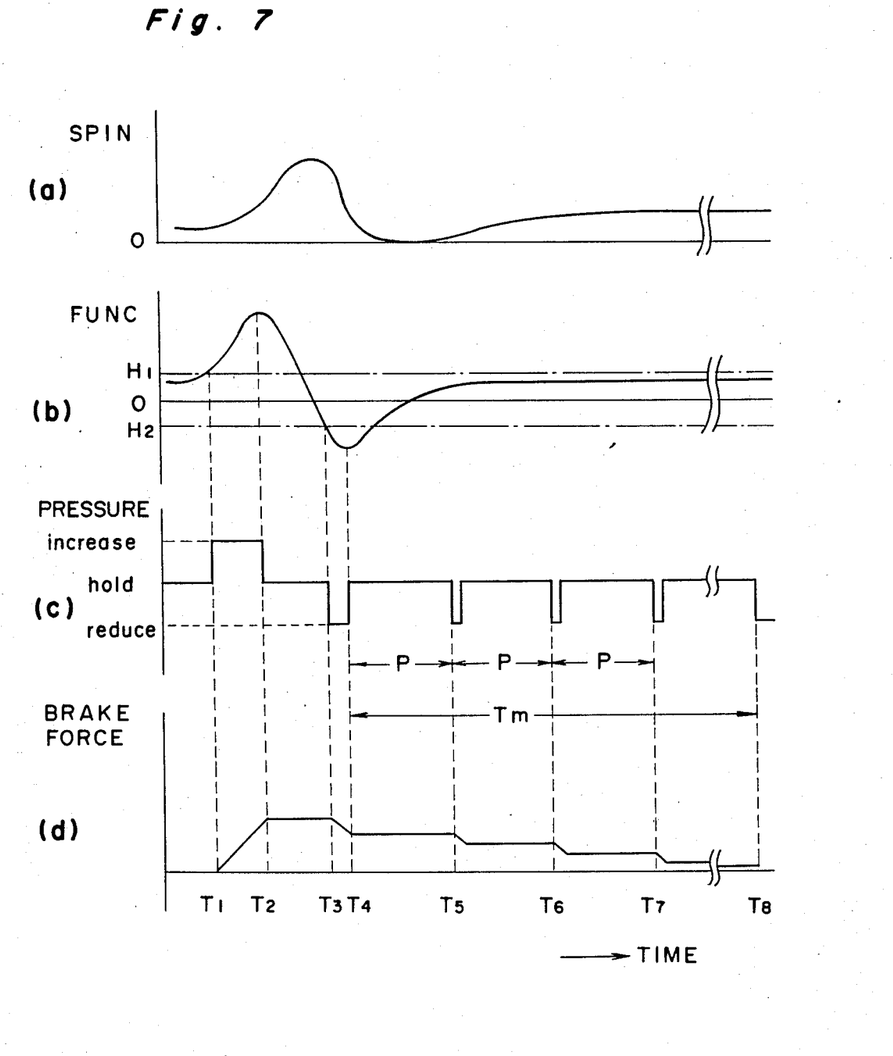
FIG. 7 shows graphs (a), (b), (c), and (d) illustrating an example of an operation of the apparatus shown in FIG. 1.

Assuming that a spin amount changes as shown in FIG. 7, graph (a), the control variable FUNC changes as shown in FIG. 7, graph (b). Since differentiated terms are included in the control variable FUNC, the change of the spin amount can be detected very quickly.

As seen from the above equation, the control variable FUNC contains the spin amount signal VD-VN, and the value of the control variable FUNC is increased by an amount d/dt(VD−VN).

At steps #3 through #8, the behavior of the wheels is detected based on the control variable FUNC. At step #3, it is detected whether or not the control variable FUNC is greater than a positive threshold $H_1$. If the control variable FUNC is greater than the threshold $H_1$, the control variable FUNC is compared at step #4 with the maximum value FPEAK which was stored in the previous cycle. If the control variable FUNC currently obtained is greater than the value of the maximum value FPEAK obtained in the previous cycle, the value of the control variable FUNC currently obtained is deemed as a positive peak value, and therefore, it is written as the FPEAK at step #5. Thus, if the program advances through step #3, step #4, and step #5, it is understood that the value of the control variable FUNC exceeds the threshold $H_1$ and is increasing in a positive direction. In other words, a spin has occurred in an excessively large amount and the spin amount is increasing. In this case, the timer is set to "0" at step #10, and at step #15, a signal for increasing hydraulic pressure, such as brake oil pressure, is transferred to brake actuator BA to apply a braking force to restrain the spin which has occurred.

If it is detected at step #4 that the value of the control variable FUNC currently obtained is smaller than the value of the FPEAK, i.e., when the value of the control variable FUNC exceeds the threshold $H_1$, but is decreasing, the program advances to step #12.

If it is detected at step #3 that the value of the control variable FUNC currently obtained is smaller than the threshold $H_1$, the program advances to step #6 where it is detected whether or not the value of the control variable FUNC is smaller than the negative threshold $H_2$. If it is detected that the value of the control variable FUNC is smaller than the threshold $H_2$, the program advances to step #7 where the value of the control variable FUNC is compared with the minimum value FPEAK which was stored in the previous cycle. If it is detected that the value of the control variable FUNC currently obtained is smaller than the minimum value FPEAK, or larger in a negative direction, the value of the control variable FUNC currently obtained is deemed as a negative peak value, and therefore, it is written as the FPEAK at step #8. Accordingly, when the program follows through step #3, step #6, step #7 and step #8, it is understood that the value of the control variable FUNC exceeds the negative threshold $H_2$ and is increasing in a negative direction. That is, the spin which has occurred in an excessively large amount is being restrained. In this case, the timer is set to "0" at step #11 and, at step #17, a signal is applied to the braking force controller BC in order for the brake actuator BA to reduce the braking force.

When it is detected that the value of the control variable FUNC is greater than the threshold $H_2$ at step #6, i.e., when the value of the control variable FUNC is in the range between the thresholds $H_1$ and $H_2$, the program goes to step #9 where the FPEAK is set to "0", and then, the program advances to step #12. Thus, the program advances to step #12 when the value of the control variable FUNC is in the range between the thresholds $H_1$ and $H_2$ or when the value of the control variable FUNC has passed the positive peak point and is decreasing, or when it has passed the negative peak point and is increasing. When the program advances from step #4 or #7 to step #12, it is understood that the value of the control variable FUNC has just immediately passed the positive or negative peak. In this case, "1" is added to the timer which has been set to "0". It is to be noted that the timer is designed to count up to an amount greater than Tm, such as up to "255".

At step #13, it is detected whether or not a value counted by the timer is a multiple of a predetermined value P, for example, 16. If it is detected that the value is a multiple of P, the program advances to step #17 where a reduce signal indicative of pressure reduction is produced which is transferred to the brake actuator BA for reducing the hydraulic pressure, such as brake oil pressure. If the value is not a multiple of P, the program advances to step #14 where the value is compared with a predetermined value Tm, for example, 128, so as to detect whether or not the control of the braking force is completed.

If the value counted by the timer is below the predetermined value Tm, the program advances to step #16 where a hold signal indicative of maintaining the brake oil pressure of the brake actuator BA is produced. If the value counted by the timer is above the predetermined value Tm, the program goes to step #17 for producing the reduce signal.

It is to be noted that the value P, which is used for the comparison with the value counted by the timer at step #13, may be changed, for example, in accordance with the value counted by the timer. The value Tm, which is compared with a value counted by the timer at step #14, may also be changed, depending on the characteristic property of the brake actuator BA.

The operation cycle described above is repeated to accomplish the control of a wheel spin.

The operation of an example illustrated in FIG. 7 is described hereinafter. From the start until the point $T_1$, the operating cycle of steps #1, #2, #3, #6, #9, #12, 13, #14, and #16 is repeated. During this period, FPEAK is made equal to "0" and the brake oil pressure of the brake actuator BA is maintained the same as before.

From the point $T_1$ until the point $T_2$, i.e., when the excessively large spin has occurred and has started to increase, the operation cycle of steps #1, #2, #3, #4, #5, #10, and #15 is repeated, and the content of the FPEAK is increased and stored during this period, thereby increasing the brake oil pressure. Thus, the braking force is increased and the spin which has occurred in an excessively large amount is restrained.

From the point $T_2$ until the point $T_3$, i.e., when the spin which has occurred in the excessively large amount is being restrained, the operation cycle of steps #1, #2, #3, #4, #12, #13, #14, and #16 is repeated during the first half period and the operation cycle of steps #1, #2, #3, #6, #9, #12, #13, #14, and #16 is repeated during the second half period. Accordingly, the content of the FPEAK is returned to "0" and the brake oil pressure is maintained at a level set at the point $T_2$. Thus, the spin which has occurred in the excessively large amount is securely restrained. From the point $T_2$, the timer starts counting. According to the example shown in FIG. 7, the program advances to another operation cycle before the timer counts the predetermined value P.

From the point $T_3$ until the point $T_4$, i.e., while the spin which has occurred in the excessively large amount is being restrained to a great extent, the operation cycle of steps #1, #2, #3, #6, #7, #8, #11, and #17 is repeated, and the content of the FPEAK is increased in the negative direction, and therefore, the brake oil pressure is reduced. Thus, while the spin which has occurred in the excessive amount is being restrained to a great extent, the braking force is decreased to control the spin amount to be at an optimum range.

From the point $T_4$ until $T_5$, i.e., when a spin amount is in the optimum value or in the vicinity of the optimum value, the operation cycle of steps #1, #2, #3, #6, #9, #12, #13, #14, and #16 is repeated, and the timer starts counting from the point $T_4$ and, at the same time, the brake oil pressure is maintained. When the timer has counted the predetermined value P at the point $T_5$, the operation cycle of steps #1, #2, #3, #6, #9, #12, #13 and #17 is performed for one cycle, whereby the brake oil pressure is reduced for a short period of time.

Each time the value counted by the timer is a multiple of P, the brake oil pressure is instantaneously reduced bit-by-bit during the period after the point $T_5$. When the value counted by the timer exceeds Tm, a signal indicative of reducing the brake oil pressure is produced continuously so as to return the brake oil pressure to "0". Thus, the control of the braking force is completed.

As apparent from the foregoing description, in the wheel spin control apparatus according to the present invention, a braking force is increased from the point immediately after a spin has occurred or is likely to occur in an excessively large amount, i.e., immediately after the rotation speed of driven wheels has become or is likely to become very high until the point when the spin amount starts to reduce. A braking force is decreased from the point when the reduction of the excessively large spin has become great until the point when the same has become not as great as before. In some periods other than the above, a braking force reduction command signal is produced at a predetermined constant or variable interval. In periods other than the above-described periods, a braking force is maintained, but is decreased little by little with a time interval of P.

After these operations are completed, the braking force is substantially reduced to zero.

According to the wheel spin control apparatus of the present invention, when a spin occurs in an excessively large amount, a braking force is quickly applied to the driven wheels. Then, when the spin in the excessively large amount is likely to reduce the braking force is maintained and removed. Thus, the spin which occurs in an excessively large amount can be efficiently prevented.

Modification 1

Figure 8A:
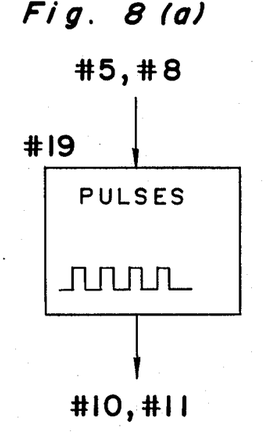
FIGS. 8(a), 8(b), and 8(c) are flow charts showing operations of a first modification.
Figure 8B:
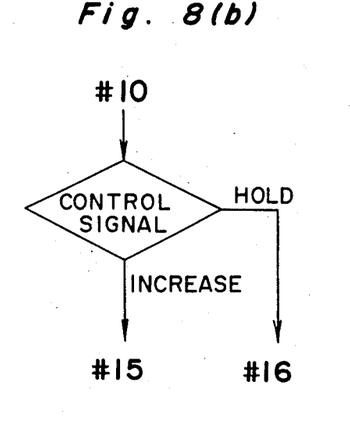
Figures 8C, 9:
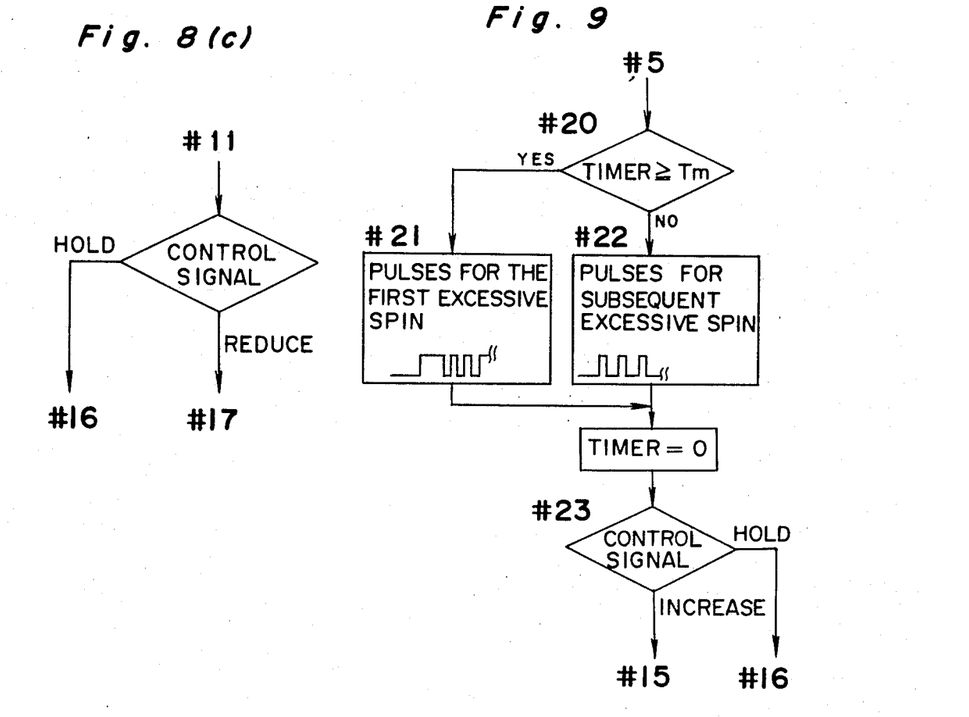
FIG. 9 is a flow chart showing an operation of a second modification.

The brake actuator BA generally used has a solenoid valve which is actuated by an externally provided driving signal, thereby a brake unit being supplied with brake oil pressure. Thus, the braking force is generated. It is important to produce the solenoid driving signal in consideration of the operation characteristic of the brake actuator BA. If a brake actuator which responds very quickly to the signal is used, the period of time required to apply the pressure to the brake unit is very short. Therefore, if a solenoid-actuate signal for actuating the solenoid is continuously produced during the period from point $T_1$ to point $T_2$, a braking force, which will be applied to the braking unit, will be more than sufficient. In order to make the brake oil pressure increase at a desired rate, it is preferable to generate, in combination of the solenoid-actuate signal and a pressure-holding signal, such as in the form -of a pulse train. Thus, the brake oil pressure will be increased intermittently at a desired rate. Similarly, when the pressure of the brake actuator is to be reduced at a required rate, it is preferable to produce, in combination of the solenoid-deactuate signal and the pressure-holding signal. In order to produce such combination signals as described above, the following arrangement should be made. A flow shown in FIG. 8(a) is inserted between step #5 and step #10 and also between step #8 and step #11. Furthermore, a flow shown in FIG. 8(b) is inserted after step #10, and a flow shown in FIG. 8(c) is inserted between step #11 and step #17 and immediately above step #17. Thus, a pulse train having a desired pulse width and pulse frequency is outputted at step #19.

Modification 2

Generally, in a brake unit, a brake pad is brought into contact with a disk by applying the brake oil pressure, thereby a braking force being produced. When the brake oil pressure is increased from zero for the first time and is raised with a pulse produced intermittently, there is a possibility that the brake pad will not be brought into instant contact with the disk, if the brake pressure is increased intermittently by pulses. In this case, the quick application of a braking force cannot be accomplished. In order to prevent such an occurrence, preferably, a signal for raising the brake oil pressure is produced not in a monotonic pulse train, but in such a state that the pulse width of the first pulse should be made great and the remaining pulses should be produced in a monotonic train, or instead, the pulse duty factor should be made great at the beginning and gradually reduced relative to the time. In order to produce such a signal as described above, a flow shown in FIG. 9 is inserted between step #5 and step #15. According to this arrangement, it is detected at step #20 whether or not a value counted by the timer exceeds Tm. If it is detected that the result is such that the value exceeds Tm, the brake oil pressure should be returned to zero by then, so that, at step #21, a pulse train in which the pulse width of a first pulse is great is applied to increase the brake oil pressure. If it is detected at step #20 that a value counted by the timer does not exceed Tm, it is so assumed that the brake oil pressure is not zero. In this case, at step #22, a monotonic pulse train is applied to raise the brake oil pressure at a required rate.

Second Embodiment

Figure 10:
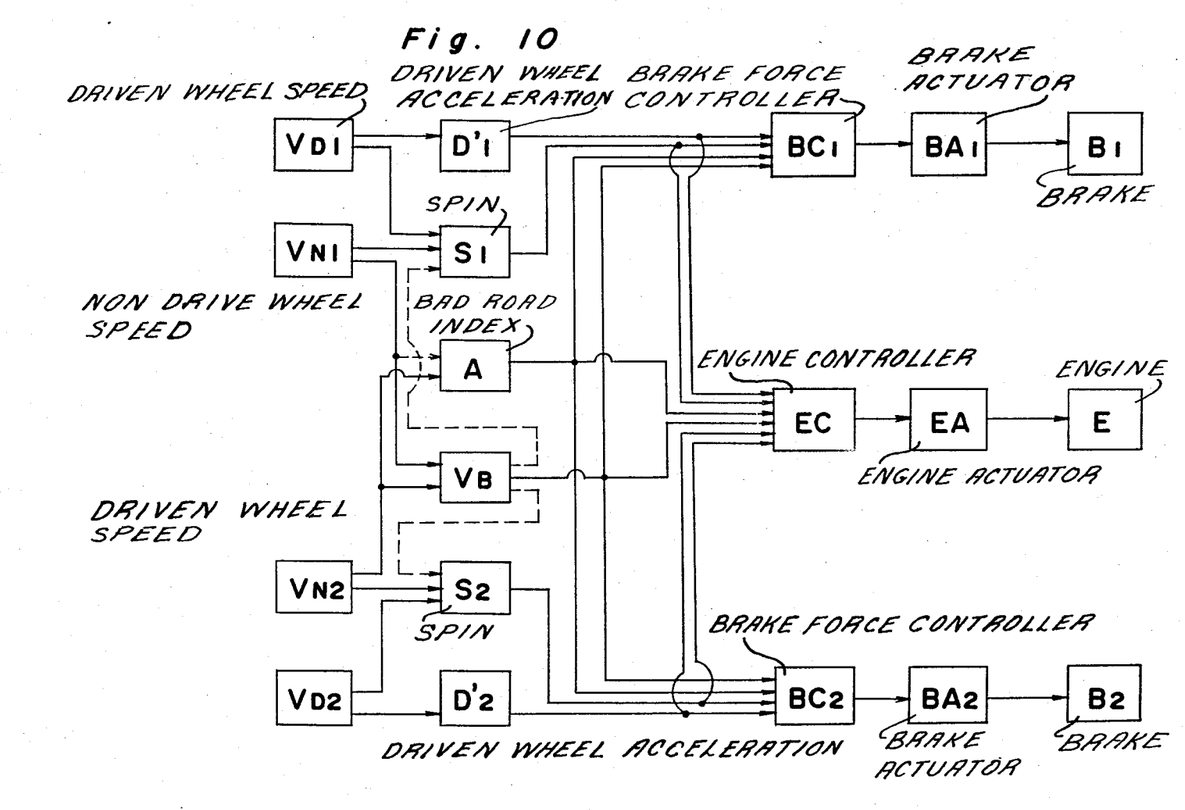
FIG. 10 is a block diagram of a wheel spin control apparatus of a second embodiment according to the present invention.

FIG. 10 shows a second embodiment of a wheel spin control apparatus according to the present invention. The control variable FUNC in this embodiment differs from that of the first embodiment. In the first embodiment, the control variable FUNC is defined as:

$$FUNC = K_2 \cdot \left\{ (VD - VN) + K_1 \cdot \frac{d}{dt}(VD - VN) \right\} \quad (1)$$

whereas in the second embodiment, the control variable FUNC is defined as:

$$FUNC = K_2 \cdot \left\{ (VD - VN) + K_1 \cdot \frac{d}{dt} VD \right\} \quad (2)$$

The relationship between equations (1) and (2) is explained below:

In equation (1), the term $d/dt(VD-VN)$ can be expressed as follows:

$$\frac{d}{dt}(VD - VN) = \frac{d}{dt}VD - \frac{d}{dt}VN \quad (3)$$

When a spin has occurred in an excessively large amount, the acceleration of the driven wheels and non-drive wheels can be considered as $$\frac{d}{dt}VD >> \frac{d}{dt}VN.$$

Therefore, the following relationship is obtained.

$$\frac{d}{dt}VD - \frac{d}{dt}VN \approx \frac{d}{dt}VD$$

Thus, equation (2) can be obtained from equation (1).

In order to perform the operation of equation (2), as shown in FIG. 10, a driven wheel-acceleration output unit D', which outputs the increase rate of the rotation speed VD of the driven wheel, namely, the acceleration thereof, is inserted between the driven wheel-speed detection unit VD and the braking force controller BC. In other words, the spin increase rate-output unit D provided in the apparatus according to the first embodiment is replaced with the driven wheel-acceleration output unit D'.

The description will now be directed to the control variable FUNC. The control variable FUNC can be generally expressed as follows:

$$FUNC = K_2 \cdot (SPIN + K_1 \cdot DSPIN) \quad (4)$$

where SPIN is the spin amount of the driven wheel or an approximated value thereof, and DSPIN is the acceleration of the spin or an approximated value thereof.

Assuming that $K_1 = 1$, equation (4) can be expressed as follows:

$$\text{FUNC} \alpha \text{SPIN} + \text{DSPIN} \tag{4'}$$

In the first embodiment, the control variable FUNC is defined based on the following relationship:

$$SPIN = VD - VN, \text{ and } DSPIN = \frac{d}{dt}(VD - VN)$$

Whereas, in the second embodiment, the control variable is defined based on the following relationship:

$$SPIN = VD - VN, \text{ and } DSPIN = \frac{d}{dt} VD$$

In other cases, it is possible to define the control variable FUNC based on different relationships, such as:

$$SPIN = VD - VB, \text{ and } DSPIN = \frac{d}{dt}(VD - VB)$$

or $$SPIN = VD - VB, \text{ and } DSPIN = \frac{d}{dt} VD.$$

When the apparatus according to the present invention is embodied as explained above, vehicle speed output unit VB should be connected with $S_1$ and $S_2$ as shown by dotted lines in FIG. 10.

The SPIN and DSPIN can be defined as follows by utilizing the equation obtained by a presumption arithmetic unit (such as disclosed in the above mentioned Japanese Patent Laid-open Publication No. 60937/1987) which computes the rotation speeds of the respective driven wheels by considering the difference in the speeds between the front wheels and the rear wheels of a vehicle when the vehicle is turning:

$$SPIN = Va - Vb \left\{ 1 + \frac{W^2}{2T^2} \cdot \left(1 - \frac{Vc}{Vb}\right)^2 \right\}$$

wherein
  $V_0$: speed of the front right wheel
  $V_2$: speed of the rear right wheel
  $V_3$: speed of the rear left wheel
  W: length of the wheel base
  T: tread width $$DSPIN = \frac{d}{dt} SPIN$$

The above equation is computed with respect to an FF-type (front-mounted, front-drive type) vehicle in which tread widths of front wheels are the same as those of rear wheels. However, the equation can be computed in the case of an FR-type (front-mounted, rear-drive type) vehicle, even though the tread widths of front wheels differ from those of rear wheels.

In the first embodiment, the spin amount control is accomplished by the control of only the braking force, whereas in the second embodiment, the spring amount control is accomplished not only by the control of the braking force, but also by the control of the engine driving force.

A wheel spin control apparatus according to the second embodiment in FIG. 10 is shown as further provided with an engine controller EC, an engine actuator EA, and an engine E in addition to the units provided, as shown in FIG. 1, for the first embodiment. The engine controller EC computes the control variable EFUNC adapted to control the engine by the following equation:

$$EFUNC = K_2 \cdot \left\{ (VD_1 - VN_1) + (VD_2 - VN_2) + K_1 \cdot \left( \frac{d}{dt} VD_1 + \frac{d}{dt} VD_2 \right) \right\} \tag{5}$$

In order to control the spin which has occurred in an excessively large amount, the first embodiment is so arranged that the braking force is controlled by increasing, maintaining, and reducing the brake oil pressure, whereas, in the second embodiment, the spin control is carried out also by controlling the driving force of an engine, in addition to the method adopted in the first embodiment. More particularly, in the second embodiment, the driving force of the engine is controlled by changing the throttle valve opening based on the control variable EFUNC. The description of the operation performed by this arrangement is omitted herein because the operation of this construction is substantially the same as that shown in FIG. 7.

It is also possible to provide the engine controller EC and the engine actuator EA in the first embodiment. In this case, the following control variable EFUNC should be used.

$$EFUNC = K_2 \cdot \left[ (VD_1 - VN_1) + (VD_2 - VN_2) + K_1 \cdot \left\{ \frac{d}{dt}(VD_1 - VN_1) + \frac{d}{dt}(VD_2 - VN_2) \right\} \right] \tag{6}$$

Here, the control variable EFUNC can be generally expressed as follows:

$$EFUNC = K_2 \cdot \{SPIN1 + SPIN2 + K_1 \cdot (DSPIN1 + DSPIN2)\} \tag{7}$$

wherein SPIN1 and SPIN2 are the spin amounts of the left-hand and right-hand driven wheels or the approximated values thereof, respectively, and DSPIN1 and DSPIN2 are the acceleration of the left-hand and right-hand driven wheels or approximated values thereof, respectively.

The SPIN1 and SPIN2 can be defined as follows:

$$SPIN1 = VD_1 - VN_1, \text{ and } SPIN2 = VD_2 - VN_2$$

or $$SPIN1 = VD_1 - VB, \text{ and } SPIN2 = VD_2 - VB$$

and the DSPIN1 and DSPIN2 can be defined as follows:

$$DSPIN1 = \frac{d}{dt}(VD_1 - VN_1), \text{ and } DSPIN2 = \frac{d}{dt}(VD_2 - VN_2)$$

or $$DSPIN1 = \frac{d}{dt}VD_1, \text{ and } DSPIN2 = \frac{d}{dt}VD_2$$

The control variable EFUNC can be defined in different expressions by combining the above SPIN1s, SPIN2s, DSPIN1s, and DSPIN2s.

The engine control EC may be controlled by detecting a spin which has occurred in an excessively large or small amount based on the average spin amount value of the left-hand and right-hand driven wheels, as described above. Also, the engine control EC may be controlled according to the spin amount which is the smaller one of the spins occurring in the left-hand driven wheel and right-hand driven wheel. This method is disclosed, for example, in Japanese Patent Application No. 258867, entitled "WHEEL SPIN CONTROL APPARATUS FOR USE IN AN AUTOMOBILE", filed Oct. 30, 1986, and assigned to the same assignee as the present application (counterpart U.S. application Ser. No. 113,156 filed Oct. 27, 1987; and counterpart E.P.C application No. 87115998.4 filed Oct. 30, 1987).

The operation of the apparatus according to the second embodiment is similar to that of the apparatus according to the first embodiment. Therefore, the description of the operation of the second embodiment is omitted for the sake of brevity. Since a spin control according to the present invention is accomplished by controlling not only the braking force, but also the driving force of the engine, a spin which has occurred in an excessively large amount can be more efficiently restrained.

As described above, a spin control apparatus according to the present invention advantageously accomplishes its object.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A wheel spin control apparatus for controlling a spin occurring on at least one of driven wheels of a vehicle by the application of a breaking force to said driven wheel, said apparatus comprising:
   a spin detector for detecting the spin amount of said driven wheel;
   a spin acceleration detector for detecting an acceleration of the spin amount;
   a calculator for calculating a varying control variable FUNC which is proportional to a sum of the spin amount and the spin acceleration; and
   a control means for controlling said driven wheel such that, when the control variable FUNC exceeds a first threshold having a positive value, the braking force is increasingly applied to the driven wheel, and when the control variable FUNC falls below a second threshold having a negative value, the braking force is decreasingly applied to the driven wheel.

2. A wheel spin control apparatus for controlling a spin occurring on at least one of driven wheels of a vehicle by the application of a braking force to said driven wheel, said apparatus comprising:
   a spin detection means for detecting the spin SPIN of the driven wheel;
   a spin acceleration detection means for detecting an acceleration DSPIN of said spin;
   a calculation means for calculating a varying control, variable FUNC given below $FUNC = SPIN + K \, DSPIN$ (K:constant);

a first threshold producing means for producing a first threshold having a positive value of said control variable FUNC;
   a comparator means for comparing the control variable FUNC with said first threshold; and
   a brake control means for producing a braking force increasing signal within a period after said control variable FUNC exceeds said first threshold and before said control variable FUNC reaches a positive peak point or a level which is in a predetermined relationship with said positive peak point, and during when said control variable FUNC is increasing, whereby when the braking force increasing signal is present, the force is increasingly applied to said driven wheel.

3. A wheel spin control apparatus as claimed in claim 2, further comprising:
   a second threshold producing means for producing a second threshold having a negative value of said control variable FUNC; and wherein
   said comparator means compares the control variable FUNC with said second threshold; and
   said brake control means produces a braking force decreasing signal within a period after said control variable FUNC falls below said second threshold and before said control variable FUNC reaches a negative peak point or a level that is in a predetermined relationship with said negative peak point, and during when said control variable FUNC is decreasing, whereby when the braking force decreasing signal is present, the braking force is decreasingly applied to said driven wheel.

4. A wheel spin control apparatus as claimed in claim 2, further comprising:
   a bad road index output means for producing a bad road index signal Ka representing the roughness or gravelliness of a road; and
   a vehicle speed producing means for producing vehicle speed signal Kb, and
   wherein
   said calculation means calculates said control variable FUNC given below $FUNC = K_2.(SPIN + K_1.DSPIN)$ in which $K_1$ is a value inversely proportional to the bad road-index Ka or an approximated value thereof, and $K_2$ is a value inversely proportional to the vehicle speed Kb or an approximated value thereof.

5. A wheel spin control apparatus as claimed in claim 4, further comprising:
   means for producing a speed of a non-driven wheel, and
   wherein said bad road-index output means comprises:
   a differentiating means for differentiating a value of the speed of the non-driven wheel;

an average taking means for taking an average of the differentiated value; and an integrating means for integrating an absolute value of a difference between the differentiated value and the average value.

6. A wheel spin control apparatus as claimed in claim 3, further comprising a brake system operable by a hydraulic pressure in response to said braking force increasing signal and said braking force decreasing signal.

7. A wheel spin control apparatus as claimed in claim 4, wherein said braking force increasing signal and said braking force decreasing signal are pulse signals each having a predetermined frequency.

8. A wheel spin control apparatus as claimed in claim 4, wherein said braking force increasing signal to be applied when the hydraulic pressure is zero comprises a train of pulses in which a first pulse has a relatively wide pulse width and pulses following the first pulse has a relatively narrow pulse width.

9. A wheel spin control apparatus as claimed in claim 2, wherein said spin detection means comprises:
means for producing a speed of a driven wheel;
means for producing a speed of a non-driven wheel;
means for obtaining a difference between said speed of said driven wheel and said speed of said non-driven wheel.

10. A wheel spin control apparatus as claimed in claim 9, wherein said spin acceleration detection means comprises differentiating means for differentiating said difference between the speed of the driven wheel and the speed of the non-driven wheel.

11. A wheel spin control apparatus as claimed in claim 2, wherein said spin acceleration detection means comprises differentiating means for differentiating said speed of said driven wheel.

12. A wheel spin control apparatus as claimed in claim 3, further comprises a counter which starts counting when said control variable FUNC attains a peak point outside a range between said first and second thresholds, and is reset after a predetermined unit of time when said control variable FUNC stays between said first and second thresholds.

13. A wheel spin control apparatus as claimed in claim 12, Wherein said brake control means momentarily produces said braking force decreasing signal when said counter is reset at a multiple of said predetermined unit of time.

14. A wheel spin control apparatus as claimed in claim 12, wherein said brake control means continuously produces said braking force decreasing signal when said counter has counted a predetermined maximum time.

15. A wheel spin control apparatus as claimed in claim 3, further comprising a counter which starts counting when said control variable FUNC attains a peak point outside a range between said first and second thresholds.

16. A wheel spin control apparatus as claimed in claim 3, further comprising a counter which starts counting when said control variable FUNC attains a peak point outside a range between said first and second thresholds, and is reset when said control variable FUNC exceeds said first threshold.

* * * * *